(12) United States Patent
Manuel et al.

(10) Patent No.: US 7,338,717 B2
(45) Date of Patent: Mar. 4, 2008

(54) TOOL AND A METHOD FOR CREATING THE TOOL

(75) Inventors: Mark Manuel, Shelby Township, MI (US); Thomas N. Greaves, Rochester Hills, MI (US)

(73) Assignee: FloodCooling Technologies, LLC, Bloomfield Hills, MI (US)

( * ) Notice: Subject to any disclaimer, the term of this patent is extended or adjusted under 35 U.S.C. 154(b) by 112 days.

(21) Appl. No.: 10/289,724

(22) Filed: Nov. 7, 2002

(65) Prior Publication Data

US 2004/0091734 A1 May 13, 2004

(51) Int. Cl.
*B21D 39/00* (2006.01)
*B32B 15/00* (2006.01)
*B32B 37/00* (2006.01)

(52) U.S. Cl. .......................... 428/621; 156/60; 156/62; 428/621; 428/655; 428/660; 428/661; 428/671

(58) Field of Classification Search ................ 428/621, 428/655, 660, 661, 662, 669, 671; 156/60, 156/63
See application file for complete search history.

(56) References Cited

U.S. PATENT DOCUMENTS

| | | |
|---|---|---|
| 1,539,887 A | 6/1925 | Vandergrift |
| 3,416,766 A | 12/1968 | Miller |
| 4,141,531 A | 2/1979 | Strausfeld |
| 4,474,722 A | 10/1984 | Martin |
| 4,702,969 A | 10/1987 | Bunkoczy |
| 4,746,055 A | 5/1988 | Ingram |
| 4,810,591 A * | 3/1989 | Sakai |
| 4,867,412 A | 9/1989 | Greune |
| 4,946,552 A | 8/1990 | Onnie |
| 4,997,602 A | 3/1991 | Trimble |
| 5,031,483 A * | 7/1991 | Weaver ................... 76/107.1 |
| 5,032,469 A * | 7/1991 | Merz et al. |
| 5,079,102 A * | 1/1992 | Tanaka et al. |
| 5,106,290 A | 4/1992 | Carver et al. |
| 5,151,167 A * | 9/1992 | Truong et al. |
| 5,156,322 A * | 10/1992 | Do-Thoi et al. |
| 5,247,861 A | 9/1993 | Jahn |
| 5,256,496 A * | 10/1993 | Kluczynski |
| 5,273,803 A | 12/1993 | Metcalf |
| 5,330,343 A | 7/1994 | Berteau |
| 5,345,052 A | 9/1994 | Puddephatt |

(Continued)

FOREIGN PATENT DOCUMENTS

DE 37 11 470 A1 10/1988

(Continued)

OTHER PUBLICATIONS

A New Rapid Tooling Method For Sheet Metal Forming Dies Inventor :Daniel Walczyk.

(Continued)

*Primary Examiner*—Archene Turner
(74) *Attorney, Agent, or Firm*—Brooks Kushman P.C.

(57) ABSTRACT

A method 10 and a laminated tool 31 which is created by the method 10 and which is formed by the selective coupling or attachment of sectional members, such as members 14, 16. The formed tool 31 includes a finished surface 36 which is formed by the selective deposition of material 30 onto surface 22.

31 Claims, 1 Drawing Sheet

U.S. PATENT DOCUMENTS

| | | | |
|---|---|---|---|
| 5,347,423 A | | 9/1994 | deNeuf |
| 5,377,116 A | | 12/1994 | Wayne et al. |
| 5,399,239 A | * | 3/1995 | Pai et al. |
| 5,400,946 A | * | 3/1995 | Weise et al. |
| 5,421,544 A | | 6/1995 | Roop |
| 5,439,622 A | | 8/1995 | Pennisi et al. |
| 5,462,263 A | | 10/1995 | Feltrin |
| 5,529,805 A | * | 6/1996 | Iacovangelo et al. |
| 5,641,448 A | * | 6/1997 | Yeung et al. ............ 264/328.1 |
| 5,779,833 A | | 7/1998 | Cawley et al. |
| 5,792,492 A | | 8/1998 | Takahashi |
| 5,793,015 A | | 8/1998 | Walczyk |
| 5,830,585 A | | 11/1998 | Hosoe |
| 5,847,958 A | | 12/1998 | Shaikh et al. |
| 5,869,353 A | | 2/1999 | Levy |
| 5,878,619 A | | 3/1999 | Walczak |
| 5,948,548 A | * | 9/1999 | Welty et al. |
| 6,024,851 A | | 2/2000 | Radhakrishnan |
| 6,025,036 A | | 2/2000 | McGill |
| 6,038,525 A | | 3/2000 | Maguire |
| 6,060,392 A | | 5/2000 | Essaian |
| 6,063,436 A | | 5/2000 | Pavell |
| 6,081,328 A | | 6/2000 | Eng |
| 6,090,207 A | | 7/2000 | Knauss |
| 6,090,507 A | | 7/2000 | Grenon |
| 6,103,402 A | | 8/2000 | Marcin, Jr. |
| 6,109,332 A | * | 8/2000 | Sachs et al. .................. 164/33 |
| 6,113,752 A | | 9/2000 | Hollstein |
| H1933 H | | 1/2001 | Zabinski |
| 6,355,331 B2 | | 3/2002 | Hillier |
| 6,391,473 B2 | * | 5/2002 | Numakura et al. |
| 6,401,001 B1 | | 6/2002 | Jang et al. |
| 6,472,029 B1 | * | 10/2002 | Skszek |
| 6,495,272 B1 | * | 12/2002 | Creber et al. |
| 6,627,835 B1 | * | 9/2003 | Chung et al. ............ 219/69.12 |
| 2002/0175265 A1 | | 11/2002 | Bak |
| 2004/0128016 A1 | | 7/2004 | Stewart |

FOREIGN PATENT DOCUMENTS

| | | | |
|---|---|---|---|
| DE | 3711740 | * | 10/1990 |
| EP | 775550 | * | 5/1997 |
| EP | 1 216 806 A2 | | 6/2002 |
| EP | 1216806 | * | 6/2002 |
| GB | 1 425 626 | | 2/1976 |
| GB | 1435626 | * | 2/1976 |
| JP | 59-218228 | * | 12/1984 |
| JP | S59-218228 A | | 12/1984 |
| WO | 8707538 | * | 12/1987 |
| WO | WO 87/07538 A1 | | 12/1987 |
| WO | 95-08416 | * | 3/1995 |
| WO | WO 95/08416 A1 | | 3/1995 |
| WO | 88/07932 | * | 10/1998 |
| WO | 01-70450 | * | 9/2001 |
| WO | WO 01/70450 A1 | | 9/2001 |
| WO | WO 03/043795 A1 | | 3/2003 |
| WO | 03-043795 | * | 5/2003 |

OTHER PUBLICATIONS

Walczyk et al., "Rapid Tooling for Sheet Metal Forming Using Profiled Edge Laminations—Design Principles and Demonstration", Transactions of the ASME, vol. 120, Nov. 1998, 5 pages.

* cited by examiner

US 7,338,717 B2

TOOL AND A METHOD FOR CREATING THE TOOL

FIELD OF THE INVENTION

The present invention generally relates to a tool and to a method for creating a tool and more particularly, to a laminated tool which may be efficiently created, which has desirable attributes, and which reliably and cost effectively produces items having a desired configuration.

BACKGROUND OF THE INVENTION

A tool is used to selectively create a tangible item or good having a desired shape, size, and/or having certain other desired attributes and properties. One tool creation strategy requires the use of a "block" of steel or another type of relatively hard material which is selectively "worked" or formed into a desired tool. While this approach does allow a tool to be selectively created, it is relatively time consuming, inefficient, and costly.

In order to address the drawbacks associated with the foregoing tool creation strategy, a laminated tool creation strategy is frequently used and requires the selective creation of various sectional members of "sections" which are made to cooperatively form the desired tool. One non-limiting example of such a lamination strategy is found within U.S. Pat. No. 5,031,483 ("the '483 patent") which issued on Jun. 16, 1991 and which is fully and completely incorporated herein by reference, word for word and paragraph for paragraph. While this lamination strategy does allow a tool to be quickly and efficiently created, it has many drawbacks such as machining the tool after the tool is assembled. By way of example and without limitation, typical and desired types of tool steels (which are commonly used to create tooling) may usually not be available to be used in an overall lamination process, due to certain inherent features or properties that prevent such steels from being efficiently cut into sections or selectively bonded or attached to other formed sections. Therefore, in many cases, alternative and undesirable or "inferior" materials must be used for laminate tool construction, thereby causing the produced tool to have undesired properties and characteristics.

While, in many instances, these alternative materials may perform satisfactorily throughout the life of the prototype or production tool, in many other instances, there may be a need for a more robust, hardened tool steel surface or a highly polished class "A" type of "working" surface which is not provided by these alternate materials. Thus, in these cases, the tool created by use of this lamination strategy does not generally have the required working surface and does not perform in a satisfactory or desired manner.

Further, the use of a lamination process may itself actually prevent the creation of such a highly polished class "A" working surface, since such a working surface is cooperatively formed by the selective coupling of each of the individual sections and, in many cases, by a bonding material which respectively resides between each adjacently coupled pair of attached sectional members and which forms part of the working surface. Particularly, the absence of homogeneous material, such as a tool forming type steel, having desired and homogeneous properties, with which to form such a working surface, actually prevents the formed working surface from being formed in the desired manner and prevents the formed working surface from producing a tool having the desired characteristics.

Further, a prototype tool is often initially built in order to ensure or verify that the designed tool does, in fact, produce an item having a desired size, shape or other configuration, to create design specifications which are used to produce the final "production tool", and to ascertain the need to modify the initial design before the time and expense of creating a final production tool is realized. Using this approach a minimum of two tools are typically required (i.e., a first or "prototype" tool and a second or "production" tool) having a desired design and configuration. The use of this first prototype tool undesirably increases overall manufacturing/production cost and the needed or required time to produce a final desired product.

The present invention overcomes some or all of the previously delineated drawbacks of tool design and creation and, by way of example and without limitation, allows for the creation of a laminated tool which has a relatively long working life and a desirably finished working surface, and which obviates the need to initially create and use a prototype tool as part of an overall process to create a "finished" or "production" tool, thereby reducing production cost and decreasing the time needed to design and produce a desired product.

SUMMARY OF THE INVENTION

It is a first non-limiting advantage of the present invention to provide a tool which overcomes some or all of the previously delineated drawbacks of prior laminated tools.

It is a second non-limiting advantage of the present invention to provide a method for creating a tool which overcomes some or all of the previously delineated drawbacks of prior tool creation methods.

It is a third non-limiting advantage of the present invention to provide a laminated tool which has a relatively long working life.

It is a fourth non-limiting advantage of the present invention to provide a laminated tool which has a working surface with a desirable finish.

It is a fifth non-limiting advantage of the present invention to provide a laminated tool which may be quickly and efficiently formed.

It is a sixth non-limiting advantage of the present invention to provide a method by which a prototype tool may be used to efficiently create a production or "finished" tool.

According to a first non-limiting aspect of the present invention, a laminated tool is provided. Particularly, the laminated tool has a first portion which is created from a first material; and a tool creation surface which is formed from a second material.

According to a second non-limiting aspect of the present invention, a tool is provided which is made by the process of creating a first sectional member; creating a second sectional member; attaching the first sectional member to the second sectional member; and placing a relatively thin layer of material upon a working surface of the second sectional member.

According to a third non-limiting aspect of the present invention, a method is provided for forming a tool comprising the steps of forming a first sectional member; forming a second sectional member; coupling the first sectional member to the second sectional member; and attaching a certain material to one surface of the second sectional member.

According to a fourth non-limiting aspect of the present invention, a method for creating a tool is provided. Particularly, the method includes the steps of creating a prototype tool having a working surface; and depositing material upon the working surface, thereby forming a tool.

These and other features, aspects, and advantages of the present invention will become apparent to those of ordinary skill in the art from a reading of the following detailed description of the preferred embodiment of the invention and by reference to the following drawings.

DETAILED DESCRIPTION OF THE PREFERRED EMBODIMENT OF THE INVENTION

Figure 1:
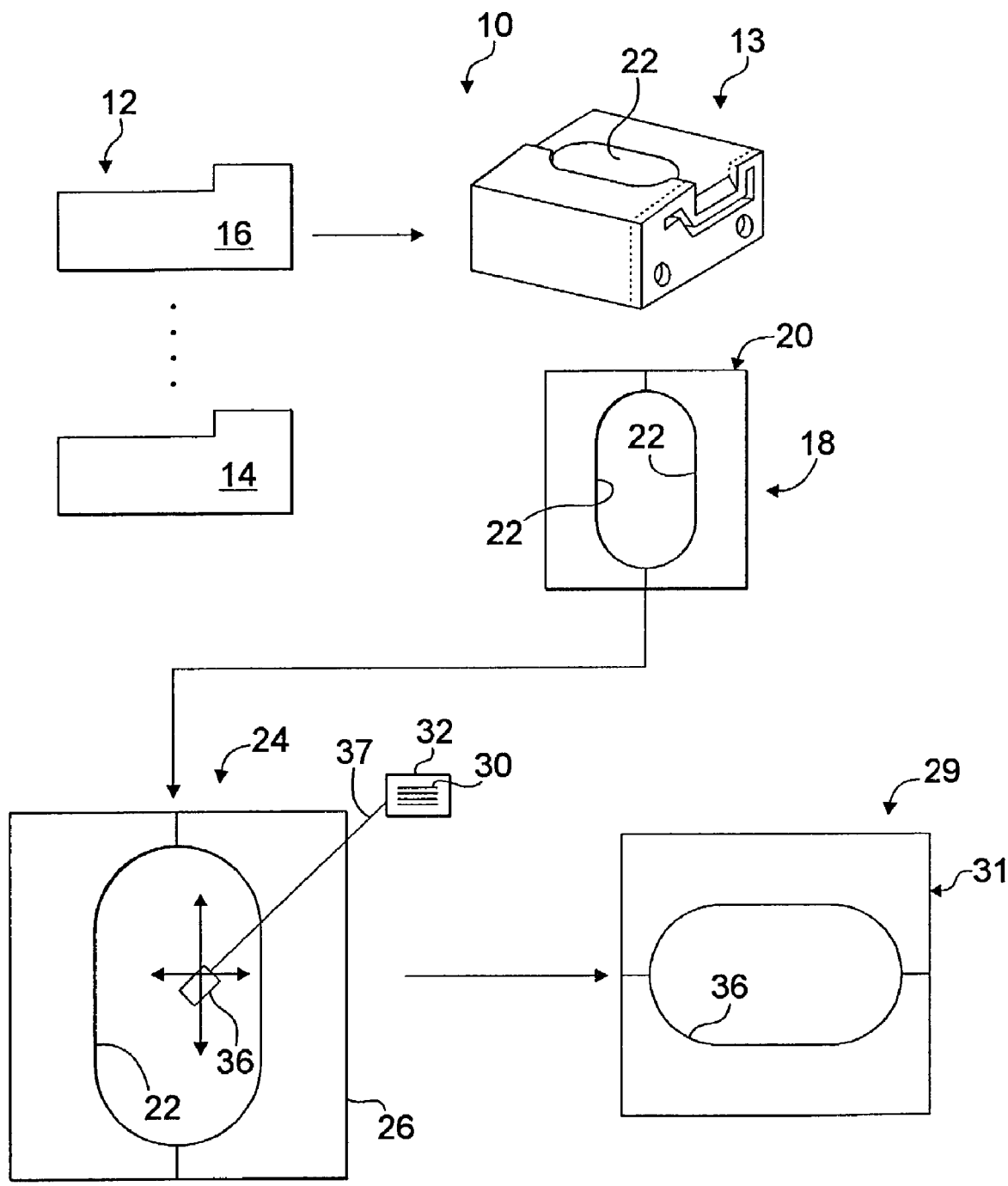
FIG. 1 is a schematic process diagram of the tool creation methodology of the preferred embodiment of the invention.

Referring now to FIG. 1, there is shown a process schematic diagram 10 which illustrates the tool creation methodology of the preferred embodiment of the invention.

Particularly, tool creation methodology 10 includes a first step 12 in which various sectional members, such as sectional members 14, 16, are created, according to the geometric requirements of the desired tool which is to be produced by the methodology 10.

As should be appreciated by those of ordinary skill in the art, the manner in which each such sectional member, such as members 14, 16, are created is dependent upon the particular lamination tool creation strategy which is employed by a user of the invention and by the requirements of the tool which is to be created. It should be realized by those of ordinary skill in the art, that the present invention is not limited to a particular type of laminated tool creation strategy or for use with a particular type of tool. For example, the sections, such as sections 14, 16, may be created in accordance with the teachings of the '483 patent, with the teachings of the "prior art" which is described within the '483 patent, or with any other lamination tool creation process, including those proprietary processes which have been developed by the Applicant.

Step 13 follows step 12 and, in this step 13, the created sectional members, such as members 14, 16, are selectively coupled or bonded together. Step 18 follows step 13 and, in this step 18, the created and then coupled or bonded sectional members, such as members 14, 16 cooperatively form an unfinished tool 20 having an unfinished working or item creation surface 22. Particularly, in one non-limiting embodiment, each of the sections, such as sectional members 14, 16, are first created and then desirably coupled (by use of a bonding material or other mechanical attachment member) to form a desired unfinished or prototype tool. Alternatively, each sectional member, once formed, is promptly attached to another sectional member, thereby sequentially "building up" a tool which is formed by the methodology 10. At the conclusion of the process step 18, a laminate tool 20 is formed. It should be noted that the term "laminate tool" has a very specific meaning in the tooling art and within this Application. Particularly, the term "laminate tool" means a tool with a working surface 22 or a working surface which is formed by several dissimilar types of materials (e.g., a bonding agent and the material used to form the sectional members, such as members 14, 16). Further, it should be appreciated that tool 20 comprises a "prototype tool" and that the term "prototype tool" also means or refers to any tool which has a relatively short "working life" (e.g., the time in which the tool may form items having a desired size, shape, or other attributes). It should be appreciated that the sectional members, such as sectional members 14, 16, may be formed from such materials as various steels, aluminums, and/or copper or from substantially any other material which is desired by the user.

After the tool 20 is formed, step 18 is followed by step 24 in which a second material 30 is deposited upon the unfinished working surface 22. Particularly, this second material 30 may selectively comprise nickel, titanium, D-2, S-7, H-13, or P-20 tool steels or other materials including various other relatively hard steels acceptable for tooling. Moreover, these materials, such as material 30, may be applied to the working surface 22 by a variety of deposition or material application techniques. By way of example and without limitations, a liquid store 32 of the second material 30 may be physically transferred 37 from the liquid store 32 to create a new surface 36 over surface 22. Particularly, a user of the methodology of the invention, selectively "sprays" the surface 22 with the second material 30 until a relatively thin layer of the second material 30 substantially covers the surface 22 creating a new surface 36. In the most preferred embodiment of the invention, the second material 30 is applied until it is deposited upon the surface 22 to about a thickness of about 0.0005 inches to about one quarter of an inch (about 0.0127 millimeters to about 6.35 millimeters). However, it should be appreciated that the thickness may vary as desired and that, in other non-limiting embodiments, the thickness of the deposited material 30 may not be uniform upon the surface 22. For example and without limitation, certain second materials 30, such as nickel may have a thickness which is about 0.0005 inches to about 0.002 inches (about 0.0127 millimeters to about 0.051 millimeters).

In one non-limiting embodiment, thermal transfer from surface 36 into tool 26 and/or other heat sink rapidly cools surface 36. The rapid cooling causes the deposited material 30 to form a "fine grain structure" without the need for subsequent heat treating. Alternatively, the tool 26 may be cooled before the material 30 is applied to it, thereby increasing the thermal gradient between the newly applied surface 36 and the tool 26 to more rapidly cool the applied material 30. Alternatively, the material 30 may be applied by a laser deposition process or by any other available process, including, but not limited to plating.

Step 24 may be followed by an additional step (not shown) of machining the surface, formed by the homogeneous and selectively deposited material 30, should the applied/deposited material 30 not have the desired thickness or a desired finish. The methodology 10 ends with step 29 in which a "finished tool" 31 is created.

Hence, it should be appreciated that the foregoing methodology 10 also allows a prototype tool 20 to be quickly and efficiently modified to create a production type tool 31, thereby reducing overall production costs and that the foregoing process or methodology 10 further allows a finished tool 31 to be formed from a "laminated tool" (e.g., a tool which is created by the use of a lamination process) while having a desired finished surface 36 which allows the finished tool 31 to have a relatively long working life while producing tangible items having a desired size, shape, and other attributes.

It is to be understood that the invention is not limited to the exact construction and method which has been illustrated and discussed above, but that various changes and modifications may be made without departing from the spirit and the scope of, the inventions as are delineated in the following claims.

What is claimed is:

1. A laminated tool having a first portion which is created from a first material and a tool creation surface which is formed from a second metal material which is selectively placed upon said first portion without machining said first portion.

2. The laminated tool of claim 1 wherein said second material has a relatively thin thickness which is about 0.0005 inches to about one quarter of an inch.

3. The laminated tool of claim 2 wherein said second material is titanium.

4. The laminated tool of claim 2 wherein said first material is copper.

5. The laminated tool of claim 2 wherein said first material is stainless steel.

6. The laminated tool of claim 2 wherein said first material is aluminum.

7. The laminated tool of claim 2 wherein said second material is tool steel.

8. The laminated tool of claim 1 wherein said second material is nickel having a thickness of about 0.0005 inches to about 0.002 inches.

9. A tool which is made by the process of creating a first sectional member; creating a second sectional member; attaching said first sectional member to said second sectional member, thereby forming a prototype tool having a tooling surface; and placing a relatively thin layer of metal material upon said tooling surface without machining said tooling surface and only after said tooling surface has been cooled, thereby forming a production tool having a finished surface and wherein said material is non-uniformly applied to said surface.

10. The tool of claim 9 wherein said relatively thin layer of material is sprayed upon said surface of said second sectional member by the use of a nozzle assembly.

11. The tool of claim 9 wherein said relatively thin layer of material is deposited upon said surface of said second sectional member by laser deposition.

12. The tool of claim 9 wherein said relatively thin layer of material is deposited upon said surface of said second sectional member by plating.

13. The tool of claim 9 wherein said second sectional member is copper.

14. The tool of claim 9 wherein said thin layer of material is titanium.

15. The tool of claim 9 wherein said thin layer of material is tool steel.

16. The tool of claim 9 wherein said thin layer of material is nickel.

17. The tool of claim 9 wherein said relatively thin layer of material has a thickness from about 0.0005 inches to about one quarter of an inch.

18. The tool of claim 9 wherein said first sectional member is bonded to said second sectional member.

19. A method for forming a tool comprising the steps of:
forming a first sectional member;
forming a second sectional member;
coupling the first sectional member to said second sectional member; and
attaching a certain metal material to one surface of said sectional members without machining said sectional members, to thereby form a working surface.

20. The method of claim 19 wherein said step of attaching said certain metal material to said one surface of said second sectional member comprises the step of depositing said certain metal material upon said second sectional member.

21. The method of claim 19 wherein said step of attaching said certain metal material to said one surface of said second sectional member comprises the step of spraying said certain material upon said second sectional member.

22. The method of claim 19 wherein said certain material is titanium.

23. The method of claim 19 wherein said certain material comprises nickel.

24. The method of claim 19 wherein said certain material comprises tool steel.

25. The method of claim 19 further comprising cooling said sectional members before attaching said certain metal material.

26. The method of claim 19 further comprising forming an item from the working surface.

27. The method of claim 19 further comprising molding an item from the working surface.

28. A laminated tool having a first portion which is created from an unfinished first material and a tool creation surface which is formed from a second metal material which is selectively placed upon said unfinished first material.

29. A tool which is made by the process of creating a first sectional member; attaching said first sectional member to a second sectional member, thereby forming a tool having an unfinished tooling surface; and placing a relatively thin layer of metal material upon said unfinished tooling surface, thereby forming a production tool having a finished surface.

30. A method for forming a tool comprising:
forming a first sectional member;
forming a second sectional member;
coupling the first sectional member to said sectional member, thereby collectively forming an unfinished surface; and
attaching a certain metal material to the unfinished surface to thereby form a finished working surface.

31. The method of claim 30 further comprising forming an item from the finished working surface.

* * * * *